United States Patent [19]
Wright

[11] 3,724,184
[45] Apr. 3, 1973

[54] DETASSELING DEVICE

[76] Inventor: Jerry L. Wright, R.R. No. 2, Scronton, Iowa

[22] Filed: Sept. 20, 1971

[21] Appl. No.: 182,034

[52] U.S. Cl. ................................................56/51
[51] Int. Cl. .............................................A01d 45/02
[58] Field of Search ..........56/51, 53, 56, 63; 171/28, 171/58

[56] References Cited

UNITED STATES PATENTS

| 2,163,849 | 6/1939 | Pfister | 56/51 X |
| 2,953,209 | 9/1960 | DeMarco | 171/28 |
| 3,524,308 | 8/1970 | Spry | 56/51 |

FOREIGN PATENTS OR APPLICATIONS

| 72,221 | 4/1953 | Netherlands | 171/58 |

Primary Examiner—Louis G. Mancene
Assistant Examiner—J. N. Eskovitz
Attorney—Henderson & Strom

[57] ABSTRACT

A device for removing tassels from corn stalks including a pair of rotatable wheels mounted at an angle with respect to one another and forming a gripping surface at an area contiguous to the pair of wheels. The pressure at the gripping surface is controlled by an adjustable hinge mounting one of the wheels. Leaf depressing rollers activated by contact with the rotating wheels are provided.

6 Claims, 4 Drawing Figures

PATENTED APR 3 1973 3,724,184

DETASSELING DEVICE

BACKGROUND OF THE INVENTION

This invention relates to a device for gripping and removing a specific portion of a growing plant, and more particularly to a device for removing tassels from the upper ends of corn stalks in connection with the growing of hybrid seed corn, although the utility of the device is not necessarily limited to such operations.

Detasseling of corn has been carried out for many years in connection with the production of hybrid seed corn for reasons well understood in the seed production art. This detasseling, which involves removing the tassel from the tips of selected rows of corn plants, is desirably done in a manner that causes minimum damage to the remaining corn plant. The most prevalent manner of accomplishing this in the past has been a manual operation in which workers pull the individual tassels by hand. Such manual detasseling is generally satisfactory, but is subject to the vagaries of the labor supply.

Several attempts have been made in the past to mechanize the detasseling operation. For example, U.S. Pat. Nos. 2,163,849; 2,397,249 and 3,524,308 all describe machines for mechanically performing the detasseling.

One problem with these mechanical detasselers is that they do not provide a satisfactory means for controlling the gripping force of the tassel-pulling surfaces. It is very desirable to be able to adjust a detasseling device for specific conditions of root depth, soil conditions, plant strength, etc. Also, there is a need for a leaf depressing means for use with a detasseling device that is inexpensive and maintenance free as compared to presently available leaf depressing means.

A need has long existed for a detasseling device that is simple, effective, and can be adapted to varying operating conditions. Such a device is provided by this invention.

SUMMARY OF THE INVENTION

According to this invention, a detasseling device is provided which includes a pair of wheels mounted at an angle to one another and having a contiguous contact area forming a gripping surface. The wheels preferably are of the rubber tired type, and the gripping surface is formed by the inner sides of the tires.

The wheels are mounted on a suitable framework which can be attached to a conventional high-clearance vehicle for traversing the fields. Generally, a plurality of units are operated simultaneously from a single high-clearance vehicle, and either the detasseling device mounting or the vehicle, or both, is adapted for adjustable height and spacing to suit the particular conditions encountered.

In accordance with this invention, one of the wheels is mounted by a hinged connection such that the pressure at the gripping surface can be selectively adjusted. One manner of accomplishing this is by provision of an adjusting nut for varying the setting of the mounting hinge. Other equivalent adjusting means would include suitable springs, pneumatic or hydraulic control means, and the like.

One feature of the invention includes novel leaf depressing rollers which are rotated by frictional engagement with the tires of the mounted wheels as will be described in detail below.

In accordance with a preferred version of the invention, a single hydraulic motor is utilized to power one of the wheels, and the other wheel is rotated due to the frictional contact at the gripping surface. The rollers in turn are also rotated by contact with the rotating wheels, so that the entire device requires only one power source.

It is an object of this invention to provide a detasseling device which is simple, reliable, and can be adapted to varying conditions.

It is a further object to provide a detasseling device having a variable gripping surface adapted to engage and remove tassels.

DESCRIPTION OF THE PREFERRED EMBODIMENT

A preferred embodiment of the invention will now be described in conjunction with the several views of the drawings.

Figure 1:
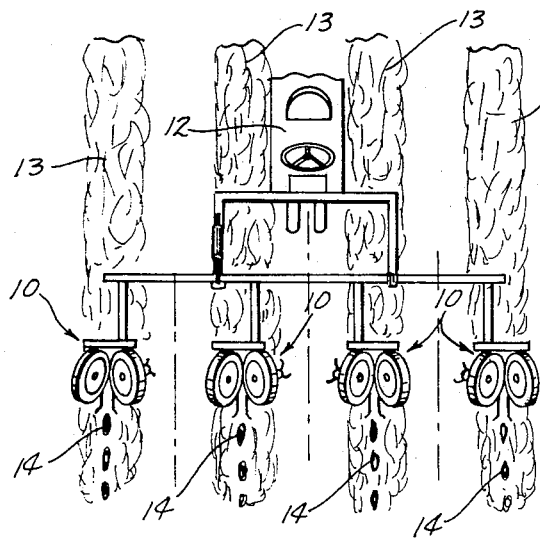
FIG. 1 is a plan view showing several of the devices of this invention mounted on a single vehicle traversing a corn field.

FIG. 1 shows four detasseling devices 10 mounted to a bar 11 of a high clearance vehicle 12. The detasseling devices 10 are spaced on the mounting bar 11 to conform to the spacing between rows 13 of corn. As the high clearance vehicle progresses, the detasseling devices 10 engage and remove tassels 14 from the corn stalks.

Figure 2:
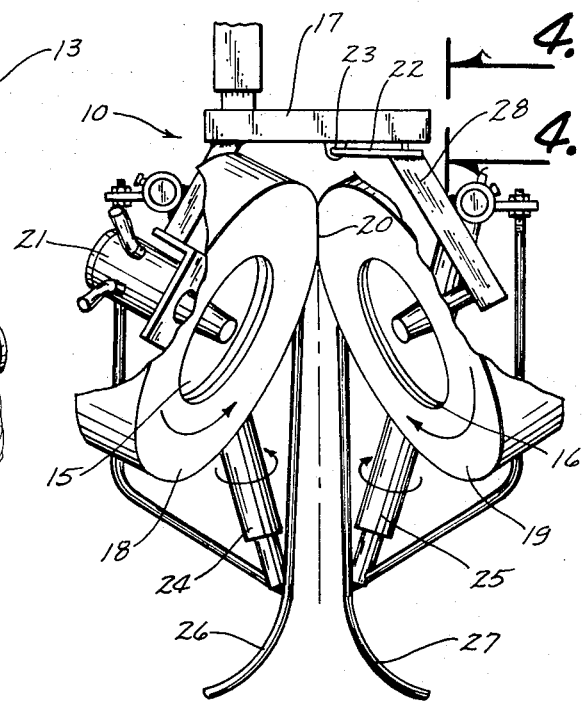
FIG. 2 is a top plan view, partially cut away, illustrating the device of this invention.
Figure 3:
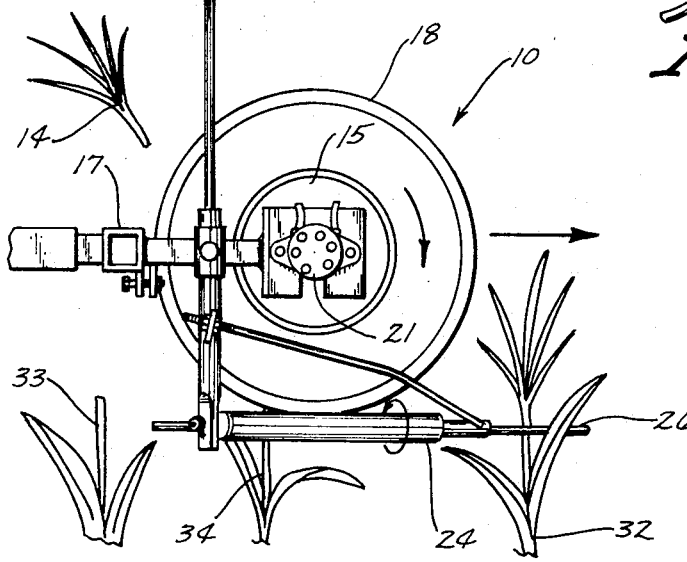
FIG. 3 is a side elevational view of the device in operation.

Details of a detasseling device 10 are shown in FIGS. 2 and 3. A pair of wheels 15 and 16 are rotatably mounted to a frame 17 at an angle to one another. Tires 18 and 19 are carried by wheels 15 and 16, respectively, and a gripping surface 20 (FIG. 2) is formed at a contiguous area of the tires 18 and 19. A hydraulic motor 21 causes wheel 15 to be rotated in the direction indicated by arrows in FIGS. 2 and 3, and wheel 16 in turn is rotated as shown in FIG. 2 due to frictional contact of tire 19 with the tire 18 on wheel 15 at the gripping surface 20.

The pressure between tires 18 and 19 at the gripping surface 20 can be varied by adjusting the position of plate 22 which is pivotally connected to the frame 17 by hinge 23.

A pair of leaf depressing rollers 24 and 25 are attached to the framework of the device in such a manner that they contact the outer surfaces of tires 18 and 19 and are rotated thereby. The rollers 24 and 25 tend to gently depress plant leaves in contact therewith so that the plant leaves will not be caught in the gripping surface 20 and damaged thereby. The rollers 24 and 25 can be simply a piece of tubular pipe surrounding a round bar as shown. This particular arrangement wherein the rollers 24 and 25 are rotated by frictional contact with tires 18 and 19 eliminates the need for separate roller actuating means.

Guide fingers 26 and 27 are provided to guide the plants toward the gripping surface.

Figure 4:
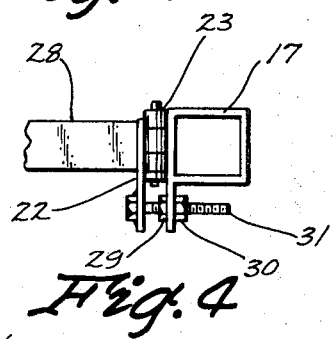
FIG. 4 illustrates a hinge and adjusting nut for controlling the pressure at the gripping surface.

FIG. 4 illustrates a preferred manner of adjusting the pressure at the gripping surface 20. Wheel mounting arm 28 is rigidly secured to plate 22 which in turn is pivotally connected to frame 17 by hinge 23 (FIG. 2). Slight rotation of plate 22 in a clockwise direction as viewed in FIG. 2 will result in a large increase in pressure at the gripping surface 20. This adjustment is useful in adapting the device to existing conditions concerning soil, plant root system, etc., and also allows for maintaining a generally consistent pressure as the contacting surfaces of the tires wear down. Again looking at FIG. 4, the arm 28 connected to plate 22 is rotated horizontally about hinge 23 by positioning nuts 29 and 30 along bolt 31 which has its head welded to plate 22.

The operation of a detasseling device in accordance with the invention is further illustrated in FIG. 3. The device 10 traverses a row of corn stalks from left to right as shown, and the stalk 32 is guided by the guide fingers to the gripping surface. A detasseled stalk 33 is shown after the device has passed it, and another stalk 34 is shown with its tassel being thrown up from the device. A plate 35 is shown to prevent the pulled tassels from being thrown onto the vehicle driver, for instance. It will be clear that conventional means are available for positioning the detasseling device on a vehicle.

While a preferred embodiment of the invention has been described above, it will be apparent that numerous variations and modifications could be made without departing from the true scope of the invention, which is to be defined by the appended claims.

I claim:

1. A device for removing tassels from plant stalks including:
   a pair of rotatable wheels mounted at an angle with respect to one another and having a gripping surface formed by mutual contact of portions of the wheels;
   means for rotating one of said pair of wheels; and
   a pair of leaf depressing rollers in contact with the rotatable wheels and rotated thereby.

2. The device of claim 1 wherein the rotatable wheels include tires forming the gripping surface.

3. The device of claim 1 wherein the means for rotating one of said pair of wheels is a hydraulic motor.

4. The device of claim 1 including means for adjusting the pressure between the pair of wheels at the gripping surface formed by said mutual contact.

5. The device of claim 4 wherein the means for adjusting the pressure between the pair of wheels includes a pivotal hinge connected to a support for one of the pair of wheels and having pressure adjusting means associated therewith.

6. The device of claim 1 wherein:
   the pair of rotatable wheels include pneumatic tires;
   one of said pair of wheels is provided with an adjustably positionable hinge mounting; and
   each of said pair of leaf depressors comprises a rotatable cylindrical element in contact with the lower outer periphery of one of said tires.

* * * * *